(12) United States Patent
Hoeft et al.

(10) Patent No.: US 6,758,490 B2
(45) Date of Patent: Jul. 6, 2004

(54) APPARATUS AND METHOD FOR INFLATABLE COMBINATION CURTAIN FOLD

(75) Inventors: David E. Hoeft, Clawson, MI (US); John Sonnenberg, Holly, MI (US); Robert F. McGee, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/841,861

(22) Filed: Apr. 25, 2001

(65) Prior Publication Data

US 2002/0158450 A1 Oct. 31, 2002

(51) Int. Cl.⁷ .............................................. B60R 21/22
(52) U.S. Cl. .................................................. 280/730.2
(58) Field of Search ......................... 280/730.2, 730.1, 280/743.1, 728.1, 732

(56) References Cited

U.S. PATENT DOCUMENTS

| | | | |
|---|---|---|---|
| 5,162,035 A | * 11/1992 | Baker | 280/743.1 |
| 5,240,282 A | * 8/1993 | Wehner et al. | 280/728.1 |
| 5,531,477 A | 7/1996 | Madrigal et al. | |
| 5,746,690 A | 5/1998 | Humbarger et al. | |
| 5,775,733 A | 7/1998 | Lunt et al. | |
| 5,865,462 A | 2/1999 | Robins et al. | |
| 5,865,465 A | 2/1999 | Bauer et al. | |
| 5,944,346 A | 8/1999 | Lachat et al. | |
| 6,000,715 A | 12/1999 | Tschaeschke | |
| 6,073,961 A | 6/2000 | Bailey et al. | |
| 6,110,094 A | 8/2000 | Wallentin et al. | |
| 6,231,070 B1 | * 5/2001 | Sunabashiri et al. | 280/730.2 |
| 6,237,943 B1 | * 5/2001 | Brown et al. | 280/728.2 |
| 6,425,601 B1 | * 7/2002 | Lewis | 102/531 |

* cited by examiner

Primary Examiner—Paul N. Dickson
Assistant Examiner—Faye M. Fleming
(74) Attorney, Agent, or Firm—Sally J. Brown

(57) ABSTRACT

A novel airbag curtain fold configuration for a safety restraint system, especially well suited to protect occupants of a vehicle from lateral impact is described. One or more airbag curtains are provided to inflate between an occupant and a lateral surface, such as a door or side window. The airbag curtain includes a first and second side. A fold portion is configured adjacent the first side and a rolled portion is configured opposite the fold portion adjacent the second side of the airbag. Attachment tabs may extend from an edge of the airbag curtain beyond the rolled and fold portions to facilitate attachment of the airbag curtain to a vehicle as part of an airbag system.

A method for folding an airbag curtain is described. A first edge of the airbag curtain is folded to a position adjacent a first side of the airbag curtain. A second edge of the airbag curtain is rolled toward the first edge of the airbag curtain until the rolled portion is substantially adjacent the fold portion on an opposing side of the airbag curtain.

49 Claims, 5 Drawing Sheets

APPARATUS AND METHOD FOR INFLATABLE COMBINATION CURTAIN FOLD

BACKGROUND OF THE INVENTION

1. Field of the Invention

The present invention relates to a folding configuration for an inflatable airbag curtain. More specifically, the present invention relates to a novel inflatable airbag curtain fold and method of folding to facilitate more accurate and efficient deployment of the airbag curtain into the interior of a vehicle.

2. The Relevant Technology

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of an explosive charge contained within a inflator. Expanding gases from the charge travel through conduits and fill the airbags, which immediately inflate in front of the driver and passenger to protect them from harmful impact with the interior of the car. Airbag systems have also been developed in response to the need for similar protection from lateral impacts between a passenger and the side of a vehicle's interior. This might occur when another vehicle collides with the side of the car, or in a rollover situation where the side of car is repeatedly impacting the ground.

Side impact airbag systems are designed to prevent the head of a vehicle occupant from emerging through the window opening or from colliding with the reaction surface at the side of the vehicle. Side impact airbags have a smaller area than front impact airbags in which to deploy and must be configured to inflate efficiently and in the right direction. Side inflatable airbag curtains are typically attached to the roof rail of a car behind the head liner However, despite their enormous lifesaving potential, side airbag curtains have typically been limited to use with types of certain vehicles with particular vehicle frame configurations. In part, these limitations are a result of the space and configuration constraints for fastening the inflatable airbag curtain of an airbag system to the roof rail of the vehicle.

The size, space, and timing consideration on the side of the vehicle are different than for the front of the vehicle and the fold configurations that worked for front airbags do not work efficiently for side airbag curtains.

Many inflatable curtain fold configurations do not allow the airbag curtain to deploy into the correct position between the occupant's head and the window, or the reaction surface if the window is down, in the most efficient manner. For example, on many of the newer, sleeker vehicles, the angle of the roof rail is flatter. Typical fold configurations used on boxier cars caused the airbag curtain to deploy inwardly at the wrong angle and consequently into the passenger, instead of down between the passenger and the side of the vehicle.

Another problem with previously known airbag curtain fold configurations is that the fold configurations caused the curtain to fold over on itself when deploying from certain roof rails, thus increasing the time for deployment and not deploying in the proper position. Yet another problem with straight roll airbag curtain fold configurations is that they immediately expand outwardly and in an annular direction and tend to bind within the head liner or otherwise facilitate interference with interior car components adjacent the place of attachment with the roof rail.

Yet another disadvantage with previously known airbag curtain fold configurations is that they cause the curtain to deploy along an improper trajectory that causes the curtain to catch on a portion of the interior of the vehicle which causes the remaining uninflated portion to ride up or move in inchworm-like motion upward instead of deploying into the proper position. Other times, the force of deployment would shear off any knobs or components inside the car when the airbag would engage them. This could cause the additional danger of flying parts.

Additionally, many airbag folding methods require extensive use of complex tools and apparatus to fold the airbag curtain. This adds to the cost of airbag manufacturing and installation. Further, many fold configurations are quite complex with multiple folds. These airbag fold configurations increase the chance of damage during the folding process. They also contain more creases which are more susceptible to tears or punctures. Under the stringent specifications for airbag manufacturing safety, these airbag curtains are more likely to have to be scrapped due to a breach in the airbag curtain's integrity. This also increases cost.

Accordingly, a need exists for a novel airbag curtain fold configuration and method of folding that accommodates the size, space, and timing considerations of side vehicle deployment. Additionally, a need exists for such a curtain fold configuration and method of folding which would allow the curtain to efficiently deploy along the proper trajectory into the correct position between the occupant's head and the window, or the reaction surface if the window is down. Furthermore, a need exists for such a curtain fold configuration and method of folding which will allow unencumbered airbag curtain deployment that will not bind or interfere with the roof rail, head liner, or other interior components. Still further, a need exists for such a curtain fold configuration and method of folding that is cost effective and does not require complex folding equipment. Additionally, a need exists for a fold configuration with minimal creases or folds. Such an airbag curtain fold and configuration of folding is disclosed and claimed herein.

BRIEF SUMMARY OF THE INVENTION

The apparatus of the present invention has been developed in response to the present state of the art, and in particular, in response to the problems and needs in the art that have not yet been fully solved by currently available inflatable airbag curtains and curtain folding methods. Thus, it is an overall objective of the present invention to provide a fold configuration for an airbag curtain and method for folding an airbag curtain to provide accurate and efficient deployment and better overall effectiveness than was possible with prior art systems.

To achieve the foregoing and other objectives, and in accordance with the invention as embodied and broadly described herein, an airbag curtain apparatus with a novel fold configuration and method of is provided. An airbag curtain includes a first side and a second side. A first edge of the airbag curtain is folded toward the first side of the air bag to create a fold portion positioned adjacent the first side of the airbag curtain. The folding of the airbag curtain may create a crease section in the airbag curtain. The fold portion may include up to about half of the airbag curtain, but preferably includes about one sixth of the airbag curtain.

The first edge of the airbag curtain contains at least one and preferably multiple attachment tabs for attaching the airbag curtain to the interior of a vehicle. An inflation conduit may be positioned adjacent the first edge of the airbag curtain to facilitate inflation of the airbag curtain.

In one preferred embodiment, the second edge of the airbag curtain is rolled toward the fold portion to create a rolled portion opposite the fold portion on the same side of the airbag. In a presently preferred embodiment, the second edge of the airbag curtain is rolled toward the second side of the airbag curtain to create a rolled portion opposite the fold portion adjacent the second side of the airbag curtain. Accordingly, the rolled portion and the fold portion are on opposing sides of the longitudinal crease section. In this configuration, the crease acts as a fulcrum causing the rolled portion of the airbag curtain to be directed into the interior of the vehicle as the airbag curtain inflates. With the rolled portion directed inwardly, and away from the roofrail and head liner components of the vehicle, the airbag curtain can unroll in the proper trajectory. Accordingly, the airbag curtain inflates to the proper position on the side of the vehicle without catching or hanging up on other parts of the car.

The height of the rolled portion may be substantially equal to the width of the fold portion. This configuration allows for efficient packaging of the airbag curtain into the overall airbag system. The single fold in combination with a rolled portion is more efficiently folded and has fewer creases which provides decreased potential for tears or holes and increased integrity for the airbag curtain.

In one preferred embodiment, the airbag curtain may contain a tether with a first end attached adjacent a first edge of the airbag curtain. A portion of the tether may be positioned within a perimeter of the airbag curtain such that it is contained within the rolled portion of the airbag curtain after folding. A second end of the tether is positioned substantially adjacent to a side edge of the airbag curtain thereby allowing the second end to be retrievable after the curtain is packaged.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4a, is not intended to limit the scope of the invention, as claimed, but is merely representative of presently preferred embodiments of the invention.

Figure 1:
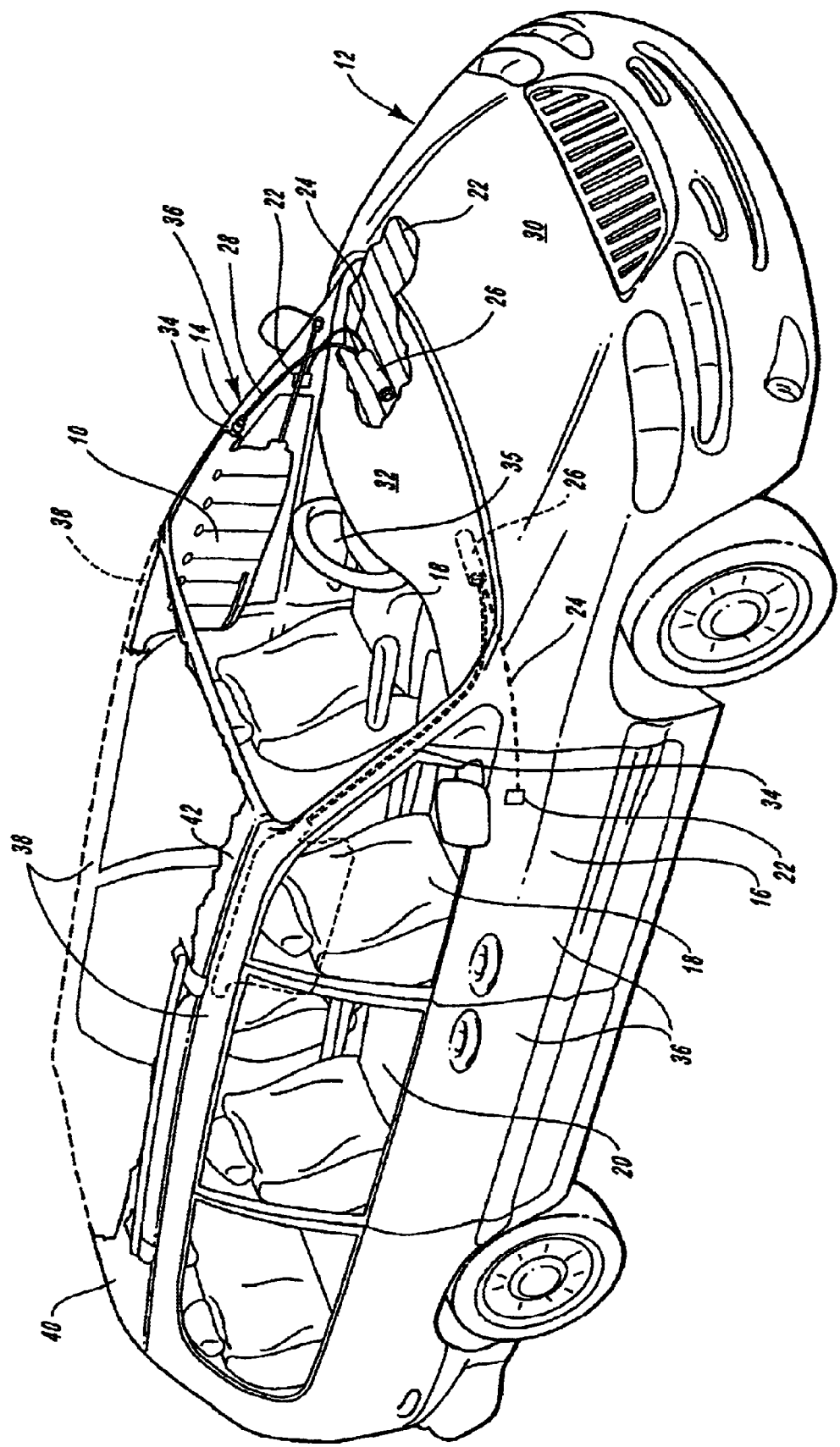
FIG. 1 is a perspective view of a vehicle incorporating an airbag curtain according to the present invention, with an airbag in an inflated position.

With particular reference to FIG. 1, an airbag curtain utilizing the present invention is generally designated at 10. The curtain 10 is shown as part of an airbag system installed in a vehicle 12. The vehicle 12 includes a driver's side 14 and a passenger side 16 with front 18 and rear 20 seats.

A sensor 22 detects sudden lateral acceleration (or deceleration) of the vehicle 12, and transmits an electric signal via an electric line 24 to a source 26 of pressurized gas. The source 26 preferably takes the form of a inflator 26 of chemically reactive material or stored gas (commonly called an inflator 26) that initiates a rapid pressure surge in the inflator 26 upon application of electricity. The expanding gases travel through a supply tube 28 to inflate an airbag curtain 10 positioned to expand between a driver and the driver's side 14 of the vehicle 12.

The sensor 22 and inflator 26 may be stowed within an interior compartment for gas delivery efficiency and available packaging space. The supply tube 28 may extend along or within a strut 34 framing a door 36 on either side 14, 16 of the vehicle 12. In one preferred embodiment, the inflator 26 is attached directly to the curtain 10, eliminating the need for a supply tube 28. The airbag curtain 10 is preferably attached to the roof rail 38 of the vehicle 12 which is the metal portion of the vehicle frame that extends along either side 14, 16 of the vehicle 12 at the junction of the side doors 36 and a roof 40. A head liner 42 conceals the airbag curtain 10.

The inflation process occurs with such rapidity that before the vehicle 12 has fully reacted to an impact the airbag curtain 10 has inflated to protect a passenger from impact against the a side 14, 16 of the vehicle 12. It will be appreciated by those of skill in the art that the airbag inflation system may be similarly configured to protect a passengers head in a front seat 18 from impact against the passenger side 16 of the vehicle. Likewise, the airbag system may contain two airbag curtains 10 on each side 14, 16 of the vehicle 12, positioned to protect passengers in both the front 18 and rear 20 seats from impact with either side 14, 16 of the vehicle 12. Additionally, one long curtain 10 can be configured to cover both the front and rear occupants. It will be appreciated by those of skill in the art that a second inflation conduit adjacent an opposing side edge 62 may be used to fill a second and connected airbag curtain for protecting passengers seated in the back seat 20.

Figure 2:
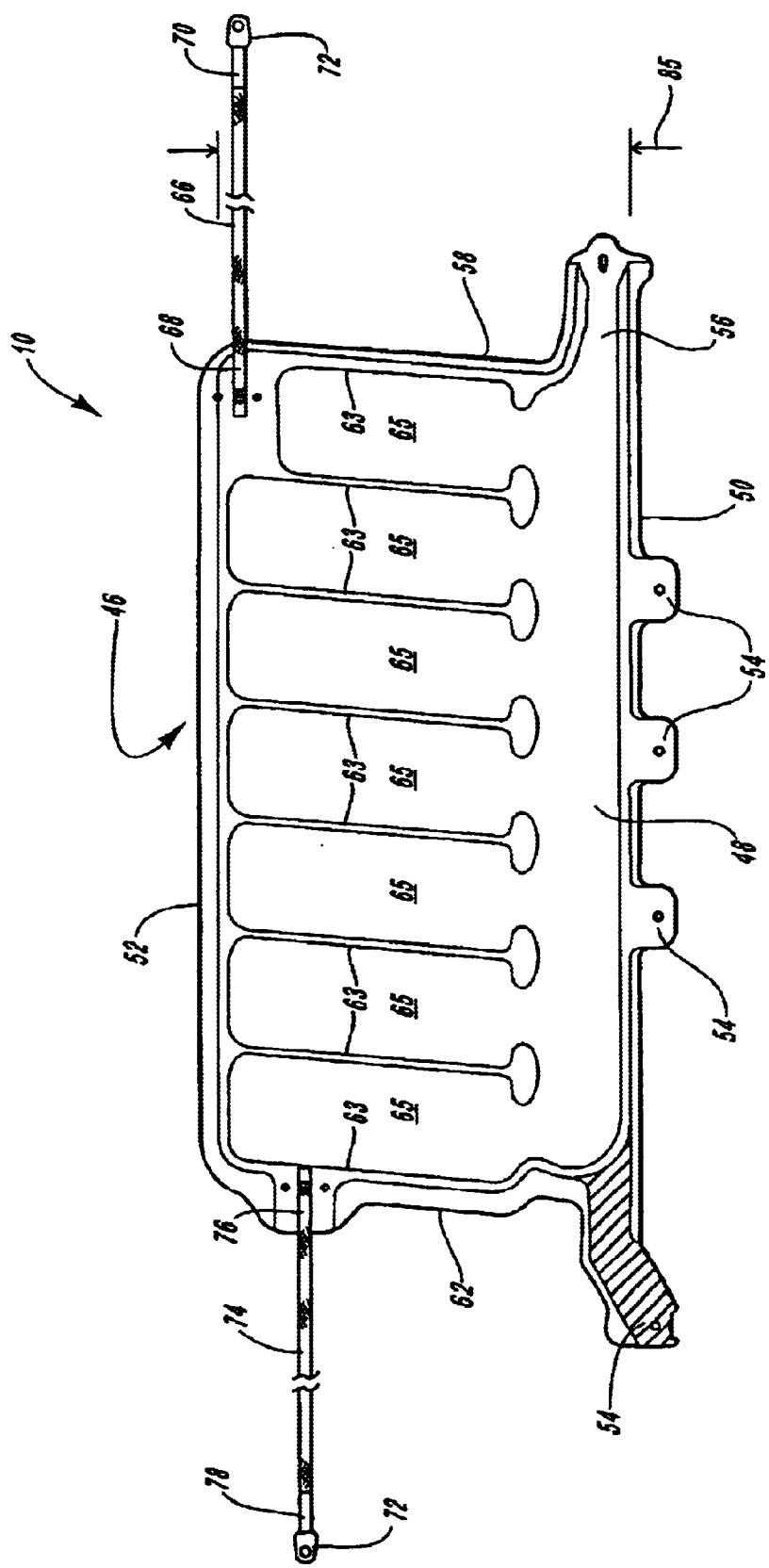
FIG. 2 is an front plan cross section view of the airbag curtain of FIG. 1 in an unfolded state.

Referring now to FIG. 2, the airbag curtain 10 of the present invention is illustrated. The airbag curtain 10 includes a first side 46, a second side 48, a first edge 50 and a second edge 52. The airbag curtain 10 also includes at least one and preferably several attachment tabs 54. The attachment tabs 54 extend beyond the first edge 50 of the airbag curtain 10 so that after the airbag curtain 10 is folded and rolled in a fully folded state, the airbag curtain 10 can be attached to the roof rail 38 of the vehicle 12 and inflated, without interference from whatever may be used to attach the airbag curtain 10 to the vehicle 12 (see FIG. 4). It will be appreciated that the tabs 54 may be configured in a variety of ways to practice the teachings of the invention. In one embodiment, the tabs 54 may be angled so that they do not need to extend beyond the first edge 50 of the airbag curtain 10.

Referring again to FIG. 2, the airbag curtain 10 also includes an inflation conduit 56 adjacent the first edge 50 of the airbag curtain 10 and proximate a first side edge 58. This conduit allows gasses from the cannister 26 to fill the airbag curtain 10 upon improper or sudden deceleration or acceleration.

FIG. 2 illustrates that the airbag curtain 10 may be produced in two pieces which are attached together by various methods including but not limited to adhesive bonding, chemical bonding, heat welding, RF welding, sewing, and swaging. Seams 63 may attached together to form distinct chambers 65, each of which will hold gas.

The airbag curtain 10 may include a first tether 66 having a first end 68 attached adjacent the first side edge 58 and the second edge 52 of the airbag curtain 10. A second end 70 of the first tether 66 is configured with an anchor 72 to facilitate securing the second edge 52 of the airbag curtain 10 to the vehicle. Similarly, a second tether 74 having a first end 76 and a second end 78 is attached by the first end 76 adjacent an opposing or second side edge 62 and the second edge 52 of the airbag curtain 10. The second end 78 of the second tether 66 is configured with an anchor 72 to facilitate securing the second edge 52 of the airbag curtain 10 to the vehicle.

Figure 3:
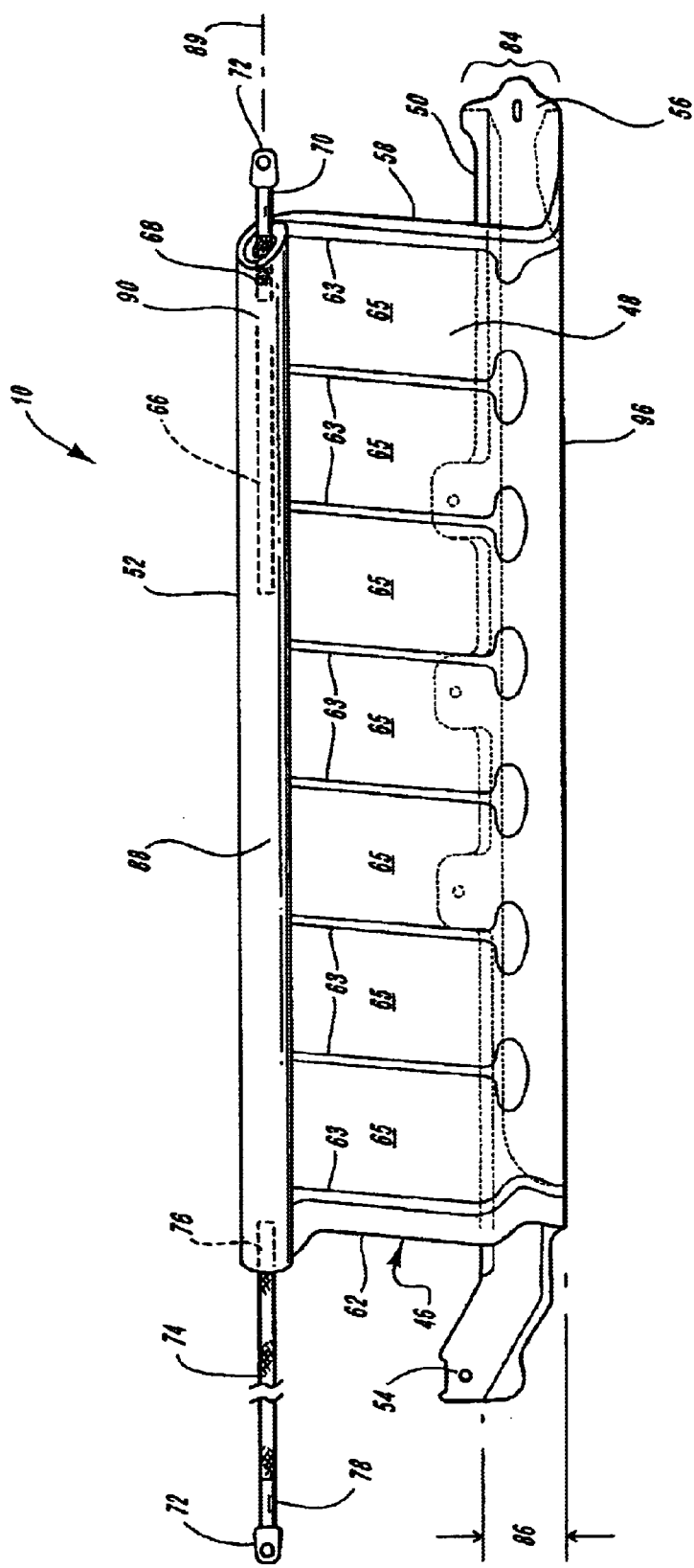
FIG. 3 is a plan view of the airbag curtain of FIG. 2 during one point in the folding process, with a single fold shown in partial phantom, and the beginning of the roll portion opposite single fold.

Referring to FIG. 3, a fold portion 84 is positioned adjacent the first side 46 of the airbag curtain 10. In one embodiment, the width 86 of the fold portion 84 is between about one half and about one twentieth of the width 85 of the airbag curtain 10. In a presently preferred embodiment, the width 86 of the fold portion 84 is about one sixth of the width 85 of the airbag curtain 10. The width 86 of the fold portion is between about 10 millimeters and about 150 millimeters and preferably less than about 46 millimeters.

The airbag curtain 10 also includes a rolled portion 88 made by rolling the second edge 52 of the airbag curtain 10 toward the first edge 50 or fold portion 84 of the airbag curtain. The rolled portion 88 can be created in a variety of ways including rolling the airbag curtain such that the rolled portion 88 is adjacent the first side 46 of the airbag curtain 10 or adjacent the second side 48 of the airbag curtain. The airbag curtain 10 may be rolled about an axis 89. A portion 90 of the first tether 66 may be positioned within a perimeter of the airbag curtain and within the rolled portion 88. In this configuration, any slack in the first tether 66 is confined within the rolled portion 88 to improve packaging of, and inflation of, the airbag 10. The second end 70 of the first tether 66 is positioned substantially adjacent to a side edge 58 of the airbag curtain 10 which allows the second end 70 and the attached anchor 72 to be retrievable and attachable after the airbag curtain 10 is fully rolled state (see FIG. 4). It will be appreciated by those of skill in the art that anchors 72 and tethers 66, 74 may be placed and secured relative to the airbag curtain 10 in a variety of configurations to facilitate securement of the airbag to the vehicle 12 such that interference with the tethers by the airbag curtain 10 is minimal upon inflation. It will also be appreciated that sail panels may be used which obviate the need for tethers 66, 74.

Figure 4:
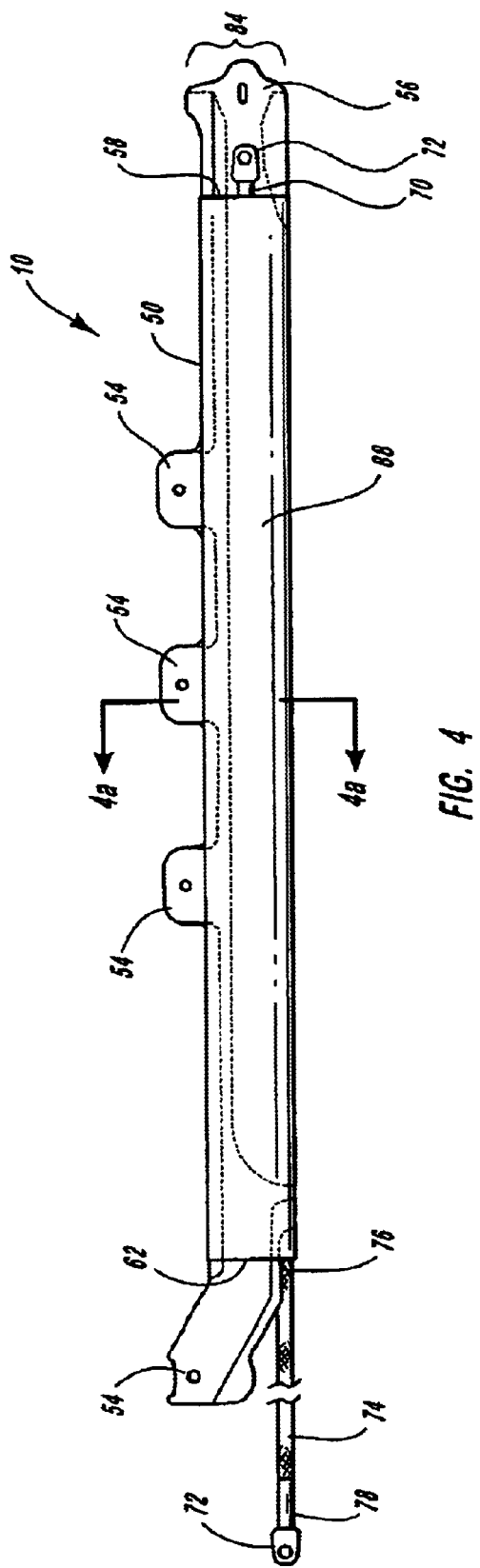
FIG. 4 is a plan view of the airbag curtain of FIG. 2 in a fully folded state with the single fold shown in partial phantom.
Figure 4A:
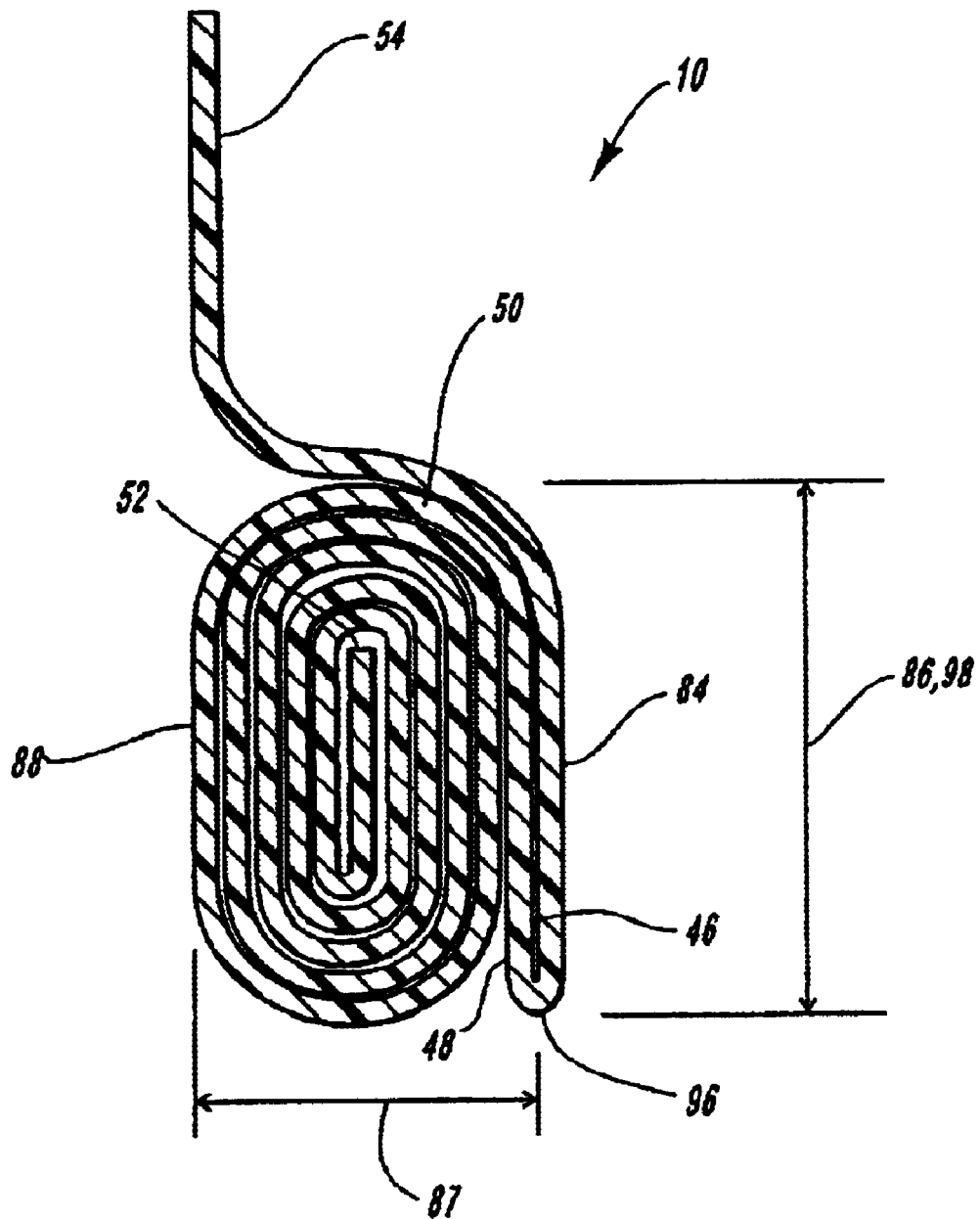
FIG. 4a is a section view of the airbag curtain of FIG. 2 in a fully folded state.

With reference to FIGS. 4 and 4a, the rolled portion 88 is positioned opposite the fold portion 84 adjacent the second side 48 of the airbag curtain 10. It will be appreciated by those of skill in the art that the rolled portion 88 may be positioned opposite the fold portion 84 on the same or first side 48 of the airbag curtain by adding an additional fold to the fold portion 84 of the airbag curtain 10.

With the second edge 52 of the airbag curtain fully rolled into place, the rolled portion 88 and the fold portion 84 are positioned on opposing sides of a crease section 96 (FIG. 4a) in the airbag curtain 10. It will be appreciated that in this configuration, with the air conduit 56 adjacent the first edge 50 of the airbag curtain on the fold portion 84 side of the crease section 96, the crease section 96 will act as a fulcrum upon inflation of the air curtain 10. Inflation will cause the rolled portion 88 to angle away from the fold portion 84, pivoting about the crease section 96. This action causes the bulk of the airbag curtain 10 to clear interior components of the vehicle 12 such as the roofrail 38 and the head liner 42 before fully deploying. Once the rolled portion 88 has angled away from the fold portion 84, the crease section 96 of the airbag curtain 10 will relax, allowing gas to more fully inflate the rolled portion 88 which can then roll unobstructed into place at the proper trajectory to a position between a passenger and the sides 14, 16 of the vehicle 12. Accordingly, the present invention allows the airbag curtain 10 to deploy along the proper trajectory into the correct position. The present invention also reduces the likelihood that the airbag curtain 10 will fold over on itself or otherwise interfere with interior car components upon inflation.

With the airbag completely rolled as illustrated in FIGS. 4 and 4a, the height 98 of the rolled portion 88 is substantially equal to the width 86 of the fold portion 84. In this configuration, the airbag curtain 10 is compact and easily installed within an airbag system. The height 98 of the rolled portion 88 may be between about 10 millimeters and about 150 millimeters. The height of the rolled portion 88 is preferably less than about 46 millimeters. The width 87 of the rolled portion may be between about 3 millimeters and about 50 millimeters and is preferably less than about 26 millimeters. It will be appreciated by those of skill in the art that the dimensions of the height and width 87 of the rolled portion 88 and the fold portion 84 may vary depending upon the size and thickness of the airbag curtain 10, and the vehicle 12 in which the airbag curtain 10 is utilized.

The attachment tabs 54 may extend beyond the rolled portion 88 in the fully rolled configuration of FIGS. 4 and 4a. This permits easy packaging of the airbag curtain 10 within an airbag system and easy attachment of the airbag curtain 10 to a vehicle without an attachment mechanism from interfering with the inflation of the airbag curtain 10. It will be appreciated by those of skill in the art that the present invention may be practiced using multiple airbags for protecting multiple passengers against impact.

Referring now to FIGS. 2–4a, a method for folding an airbag curtain, includes the step of folding the first edge 50 of the airbag curtain 10 to a position adjacent a first side 46 of the airbag curtain 10 to create the fold portion 84 and crease 96. The folding step further includes folding between about one half and about one tenth of the width 85 of the airbag curtain 10 to a position adjacent the first side 46 of airbag curtain 10. Preferably, about one sixth of the width 85 of the airbag curtain 10 is folded to a position adjacent the first side 46 of the airbag curtain 10.

The method also includes rolling a second edge 52 of the airbag curtain 10 about axis 89 toward the first edge 50 of the airbag curtain 10 to create a rolled portion 88 of the airbag curtain opposite the fold portion 84. The rolled portion 88 may be on the same side as the fold portion 88, but is preferably adjacent a second 48 opposing side. As shown in FIG. 3, the axis 89 and crease 96 may be substantially parallel. The step of rolling the second edge 52 of the airbag curtain 10 toward the first edge 50 is continued until the height 98 of the rolled portion 88 is substantially equal to the width 86 of the fold portion 84. Preferably, the height of the rolled portion is less than about 46 millimeters and the width 87 of the rolled portion 88 is less than about 26 millimeters.

It will be appreciated that by utilizing a single fold and a single roll, the fold process is simplified and requires less complex folding apparatus to accomplish the fold configuration. Still further, the fold configuration of the present invention includes fewer creases in the airbag curtain which reduces the likelihood of tear or puncture and maximizes the integrity of airbag curtain.

In a presently preferred embodiment where the airbag curtain 10 comprises one or more tethers, a first tether 66 may be attached near the first edge 52 of the airbag curtain 10. The method further includes the step of placing a portion of the first tether 66 within a perimeter of the airbag curtain 10 and placing a second end 70 of the first tether substantially adjacent to a side edge of the curtain thereby allowing the second end 70 to be retrievable after the airbag curtain 10 is rolled.

In the method of the present invention, the airbag curtain 10 includes at least one and preferably several attachment tabs 54 that extend beyond the first edge 52 of the airbag curtain 10. After the step of rolling, the attachment tabs 54 may extend beyond the rolled portion 88 of the airbag curtain 10, which allows the packaged or folded airbag to be attached to a vehicle without interference.

In one presently preferred method of folding an airbag curtain 10, the method includes the step of laying the airbag curtain 10 flat on a folding surface (not shown). This step further includes securing the airbag curtain to the folding surface with suction. It will be appreciated by those of skill in the art that there are several ways to secure an airbag curtain 10 to a folding surface including the use of clamps, adhesives, and sewing extra material to the table which is later discarded. It will further be appreciated that devices other than folding tables may also be used to practice the method of the present invention. these may include folding machines, vacuum systems, and the like.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method for folding an airbag curtain, the method comprising:

folding a first edge of the airbag curtain to a position adjacent a first side of the airbag curtain to thereby create a fold portion and a crease; and rolling a second edge of the airbag curtain toward the first edge of the airbag curtain to thereby create a rolled portion of the airbag wherein the rolling occurs about an axis substantially parallel to the crease, and wherein the fold portion and the rolled portion are positioned on opposing sides of said crease in the airbag curtain.

2. The method of claim 1, wherein the folding step comprises folding between about one half and about one twentieth of the width of the curtain to a position adjacent the first side of air bag.

3. The method of claim 1, wherein the folding step comprises folding between about one sixth of the width of the curtain to a position adjacent the first side of the curtain.

4. The method of claim 1, wherein the width of the fold portion is between about 10 and about 150 millimeters.

5. The method of claim 1, wherein the width of the fold portion is less than about 46 millimeters.

6. The method of claim 1, wherein the rolled portion is substantially adjacent the fold portion on the same side of the airbag curtain.

7. The method of claim 1, wherein the rolling step comprises rolling the second edge of the airbag adjacent a second side of the airbag curtain.

8. The method of claim 7, wherein the rolled portion is substantially adjacent the fold portion on an opposing side of the airbag curtain.

9. The method of claim 1, wherein the step of rolling further comprises rolling the second edge of the curtain toward a second side of the curtain until the height of the rolled portion is substantially equal to the width of the fold portion.

10. The method of claim 1, wherein the height of the rolled portion is between 10 and 150 millimeters.

11. The method of claim 1, wherein the height of the rolled portion is less than about 46 millimeters.

12. The method of claim 1, wherein the width of the rolled portion is between about 3 millimeters and about 50 millimeters.

13. The method of claim 1, wherein the width of the rolled portion is less than about 26 millimeters.

14. The method of claim 1, further comprising the step of laying the curtain flat on a folding surface.

15. The method of claim 14, wherein the laying step comprises securing the curtain to the folding surface with suction.

16. The method of claim 1, wherein the airbag curtain comprises a first tether attached adjacent a first edge of the curtain.

17. The method of claim 16, further comprising the step of placing a portion of the first tether within a perimeter of the curtain.

18. The method of claim 16, further comprising the step of placing a second end of the first tether substantially adjacent to a side edge of the curtain thereby allowing the second end to be retrievable after the curtain is rolled.

19. The method of claim 1, the airbag curtain comprises an attachment tab that extends beyond the first edge of the airbag curtain.

20. The method of claim 19, wherein attachment tab extends beyond the rolled portion of the curtain, thereby permitting the packaged airbag to be attached to a vehicle.

21. A method for folding an airbag curtain, the method comprising:

folding a first edge of the airbag curtain to a position adjacent a first side of the airbag curtain to thereby create a fold portion and a crease; and rolling a second edge of the airbag curtain toward the first edge of the airbag curtain to thereby create a rolled portion of the airbag adjacent a second side of the airbag curtain opposite the fold portion wherein the rolling occurs about an axis substantially parallel to the crease, and wherein the fold portion and the rolled portion are positioned on opposing sides of said crease in the airbag curtain.

22. The method of claim 21, wherein the folding step comprises folding between about one half and about one twentieth of the width of the curtain to a position adjacent the first side of air bag.

23. The method of claim 22, wherein the folding step comprises folding between about one sixth of the width of the curtain to a position adjacent the first side of the curtain.

24. The method of claim 23, wherein the width of the fold portion is between about 10 and about 150 millimeters.

25. The method of claim 21, wherein the step of rolling further comprises rolling the second edge of the curtain toward a second side of the curtain until the height of the rolled portion is substantially equal to the width of the fold portion.

26. The method of claim 25, wherein the height of the rolled portion is between 10 and 150 millimeters.

27. The method of claim 25, wherein the width of the rolled portion is between about 3 millimeters and about 50 millimeters.

28. The method of claim 21, wherein the airbag curtain comprises a first tether attached adjacent a first edge of the curtain.

29. The method of claim 28, further comprising the step of placing a portion of the first tether within a perimeter of the curtain before the step of rolling thereby allowing the second end of the tether to be retrievable after the curtain is rolled.

30. The method of claim 21, the airbag curtain comprises an attachment tab that extends beyond the first edge of the airbag curtain.

31. The method of claim 30, wherein attachment tab extends beyond the rolled portion thereby permitting the packaged airbag to be attached to a vehicle.

32. An airbag curtain fold configuration comprising:

an airbag curtain having a first side and a second side and a first edge and a second edge;

a fold portion comprising the first edge folded adjacent the first side of the airbag curtain;

a rolled portion comprising the second edge rolled toward the first edge, said rolled portion being opposite the fold portion; and a crease disposed between the fold portion and the rolled portion, wherein the rolled portion is rolled about an axis substantially parallel to said crease, and wherein the fold portion and the rolled portion are positioned on opposing sides of said crease in the airbag curtain.

33. The airbag curtain fold configuration of claim 32, wherein the rolled portion is positioned adjacent the second side of the airbag curtain.

34. The airbag curtain fold configuration of claim 32, wherein the rolled portion is positioned adjacent the first side of the airbag curtain.

35. The airbag curtain fold configuration of claim 32, wherein the airbag curtain further comprises an inflation conduit adjacent the first edge of the airbag curtain.

36. The airbag curtain fold configuration of claim 32, wherein the fold portion comprises between about one half and about one twentieth of the width of the airbag curtain.

37. The airbag fold configuration of claim 36, wherein the fold portion comprises about one sixth of the width of the airbag curtain to a position adjacent the first side of the curtain.

38. The airbag fold configuration of claim 32, wherein the width of the fold portion is between about 10 and about 150 millimeters.

39. The airbag fold configuration of claim 32, wherein the width of the fold portion is less than about 46 millimeters.

40. The airbag fold configuration of claim 32, wherein the height of the rolled portion is substantially equal to the width of the fold portion.

41. The airbag fold configuration of claim 32, wherein the height of the rolled portion is between about 10 and about 150 millimeters.

42. The airbag fold configuration of claim 32, wherein the height of the rolled portion is less than about 46 millimeters.

43. The airbag fold configuration of claim 32, wherein the width of the rolled portion is between about 3 millimeters and about 50 millimeters.

44. The airbag fold configuration of claim 32, wherein the width of the rolled portion is less than about 26 millimeters.

45. The airbag fold configuration of claim 32, wherein the airbag curtain further comprises a tether with a first end attached adjacent a first edge of the curtain.

46. The airbag fold configuration of claim 45 wherein a portion of the tether is positioned within a rolled portion.

47. The airbag fold configuration of claim 46 wherein a second end of the tether is positioned substantially adjacent to a side edge of the airbag curtain thereby allowing the second end to be retrievable after the curtain is packaged.

48. The airbag fold configuration of claim 32, wherein the airbag curtain further comprises an attachment tab extending beyond the first edge of the airbag curtain and beyond rolled portion thereby permitting the packaged airbag to be attached to a vehicle.

49. The airbag fold configuration of claim 32, further comprising two airbag curtains, each airbag curtain having a first side and a second side with a fold portion adjacent the first side of each airbag curtain and a rolled portion opposite the fold portion adjacent the second side of each airbag curtain.

* * * * *